(12) United States Patent
Jeong

(10) Patent No.: US 11,607,942 B2
(45) Date of Patent: Mar. 21, 2023

(54) MOUNTING STRUCTURE FOR POWER ELECTRIC MODULE AND VEHICLE BODY PROVIDED WITH THE SAME

(71) Applicants: Hyundai Motor Company, Seoul (KR); Kia Corporation, Seoul (KR)

(72) Inventor: Songjae Jeong, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 101 days.

(21) Appl. No.: 17/241,293

(22) Filed: Apr. 27, 2021

(65) Prior Publication Data
US 2022/0212529 A1 Jul. 7, 2022

(30) Foreign Application Priority Data
Jan. 6, 2021 (KR) .................. 10-2021-0001394

(51) Int. Cl.
*B60K 1/04* (2019.01)

(52) U.S. Cl.
CPC ........ *B60K 1/04* (2013.01); *B60K 2001/0411* (2013.01)

(58) Field of Classification Search
CPC .............. B60K 1/04; B60K 2001/0438; B60K 2001/0405; B60L 50/66; B62D 24/00; B62D 24/04
See application file for complete search history.

(56) References Cited

U.S. PATENT DOCUMENTS

| | | | |
|---|---|---|---|
| 2009/0152034 A1* | 6/2009 | Takasaki ................ | B60L 50/52 180/68.5 |
| 2013/0200654 A1* | 8/2013 | Ogawa ................. | B62D 25/087 296/187.11 |
| 2014/0152051 A1* | 6/2014 | Saitou ................... | B62D 25/20 296/187.09 |
| 2014/0246260 A1* | 9/2014 | Awano ................. | B62D 25/082 180/271 |
| 2015/0061272 A1* | 3/2015 | Watanabe ............ | B62D 27/065 280/784 |
| 2015/0314810 A1* | 11/2015 | Watanabe ............. | B62D 21/11 296/203.02 |
| 2016/0129774 A1* | 5/2016 | Shibata ................ | B62D 25/082 180/297 |
| 2019/0061507 A1* | 2/2019 | Nitta ..................... | B60L 50/66 |
| 2019/0322164 A1* | 10/2019 | Sasaki ................... | B60K 1/04 |
| 2019/0359048 A1* | 11/2019 | Tsuyuzaki ............. | B60K 1/04 |
| 2019/0359265 A1* | 11/2019 | Tsuyuzaki ........... | B60R 13/0861 |
| 2020/0102014 A1* | 4/2020 | Sakai ..................... | B62D 21/07 |
| 2020/0307697 A1* | 10/2020 | Takahashi ............. | B62D 5/0403 |
| 2021/0178912 A1* | 6/2021 | Riley ..................... | B60K 1/04 |
| 2021/0179180 A1* | 6/2021 | Lee ....................... | B62D 27/026 |
| 2021/0221436 A1* | 7/2021 | Tsuyuzaki ............ | B62D 25/025 |

(Continued)

*Primary Examiner* — Jeffrey J Restifo
(74) *Attorney, Agent, or Firm* — Morgan, Lewis & Bockius LLP

(57) ABSTRACT

A power electric module mounting structure may include a front side member provided in a longitudinal direction of a vehicle body and including a side surface formed in an internal direction of the vehicle body and an upper surface connected to the side surface, a bulk head mounted inside the front side member, and a mounting bracket connected to the side surface and the upper surface of the front side member through the bulk head to mount a power electric module on the mounting bracket.

13 Claims, 7 Drawing Sheets

(56) References Cited

U.S. PATENT DOCUMENTS

| | | | |
|---|---|---|---|
| 2021/0221442 A1* | 7/2021 | Takahashi | B62D 27/02 |
| 2021/0284243 A1* | 9/2021 | Takahashi | B62D 25/025 |
| 2022/0032758 A1* | 2/2022 | Kaneko | B62D 21/11 |
| 2022/0144063 A1* | 5/2022 | Tatsuwaki | H01M 10/00 |
| 2022/0176791 A1* | 6/2022 | Danneberg | B60K 1/04 |
| 2022/0212529 A1* | 7/2022 | Jeong | B60K 1/04 |
| 2022/0258585 A1* | 8/2022 | Yaita | B62D 21/15 |
| 2022/0258620 A1* | 8/2022 | Iemura | B60K 1/04 |

\* cited by examiner

MOUNTING STRUCTURE FOR POWER ELECTRIC MODULE AND VEHICLE BODY PROVIDED WITH THE SAME

CROSS-REFERENCE TO RELATED APPLICATION

The present application claims priority to and the benefit of Korean Patent Application No. 10-2021-0001394 filed on Jan. 6, 2021, the entire contents of which is incorporated herein for all purposes by this reference.

BACKGROUND OF THE INVENTION

Field of the Invention

The present invention relates to a power electric module mounting structure and a vehicle body including the same. More particularly, the present invention relates to a power electric module mounting structure and a vehicle body including the same, which improves the performance of collision and noise, vibration, and harshness (NVH), and secures a front trunk space.

Description of Related Art

Globally, research on electric vehicles (EVs) is accelerating in a response to exhaust gas regulations and the demand for environment-friendly vehicles. Here, the electric vehicle may include both a battery-powered vehicle and a hydrogen-based fuel cell vehicle.

In the case of a general EV-only vehicle, it is being developed to mount a power electric module on the subframe by having a sub-frame under the vehicle. When the power electric module is mounted through the sub-frame, the distance between the sub-frames from the mass center of the power electric module is short, which is advantageous in terms of durability and noise, vibration, and harshness (NVH) performance.

However, when developing a vehicle based on a vehicle that mounts a general internal combustion engine and an EV vehicle derived therefrom as a vehicle, it may be difficult to mount a sub-frame or the mounting cost may increase considerably.

Therefore, it may be considered that the power electric module of the derived EV vehicle is mounted on the side member, but there may be a problem of separation when a vehicle crashes.

Furthermore, mounting the power electric module to the upper panel of the vehicle body may be considered, but in the instant case, the distance between the sub-frames from the mass center of the power electric module is relatively long, resulting in disadvantages in durability and NVH performance. Furthermore, there is a problem in that the space occupied by the power electric module is relatively large, so that the space for using the front trunk is relatively reduced.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a power electric module mounting structure and a vehicle body including the same, which improves the performance of collision and NVH, and secures a front trunk space.

A power electric module mounting structure according to various exemplary embodiments of the present invention may include a front side member provided in a longitudinal direction of a vehicle body and including a side surface formed in an internal direction of the vehicle body and an upper surface connected to the side surface, a bulk head mounted inside the front side member, and a mounting bracket connected to the side surface and the upper surface of the front side member through the bulk head to mount a power electric module on the mounting bracket.

The bulk head may include a first connection portion for coupling with the mounting bracket, and a second connection portion bent from the first connection portion.

The bulk head may further include a connection pipe connected to the first connection portion, and a connection rod mounted on the second connection portion.

The first connection portion may include a first recess portion formed stepped inwardly.

The first connection portion may further include a second recess portion formed more concave inward than the first recess portion to mount the connection pipe.

In the second connection portion, a connection hole to which the connection rod is connected may be formed.

The bulk head may further include an extension curved from the first connection portion.

The bulk head may be provided in plural, and the mounting bracket may be connected to at least two bulk heads.

The mounting bracket may include a bracket side connection portion connected to the side surface, and a bracket upper connection portion connected to the upper surface.

A trunk compartment may be formed on the upper portion of the power electric module.

An EV vehicle according to various exemplary embodiments of the present invention may include the power electric module mounting structure.

According to various exemplary embodiments of the present invention, it is possible to reduce the size of the power electric module assembly, securing the space available for the front trunk by mounting the power electric module on the side member, According to various exemplary embodiments of the present invention, the relative distance between the central axis of the power electric module and the mount position may be reduced, thus suppressing the vibration in the up and down direction of the power electric module.

According to various exemplary embodiments of the present invention, it is possible to improve the rolling characteristics of the power electric module by mounting the power electric module through the side and upper surfaces of the side members.

Furthermore, the effect obtained or predicted by various exemplary embodiments of the present invention will be included directly or implicitly in the detailed description of various exemplary embodiments of the present invention. That is, various effects predicted according to various exemplary embodiments of the present invention will be included within a detailed description to be described later.

The methods and apparatuses of the present invention have other features and advantages which will be apparent from or are set forth in more detail in the accompanying drawings, which are incorporated herein, and the following Detailed Description, which together serve to explain certain principles of the present invention.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
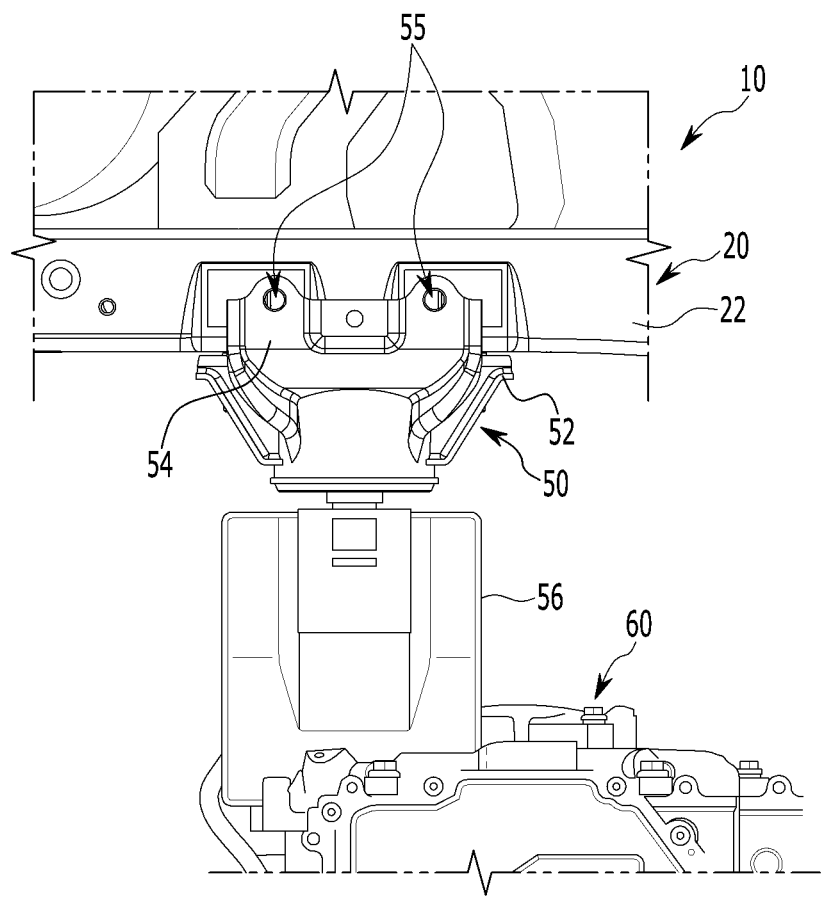
FIG. 1 is a top plan view of a power electric module mounting structure according to various exemplary embodiments of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

In the following detailed description, only certain exemplary embodiments of the present invention have been shown and described, simply by way of illustration.

As those skilled in the art would realize, the described embodiments may be modified in various different ways, all without departing from the spirit or scope of the present invention Parts indicated by the same reference numerals throughout the specification refer to the same components.

In the drawings, the thickness of layers, films, panels, regions, etc., are exaggerated for clarity.

When a part such as a layer, film, region, or plate is said to be "on" another part, this includes not only the case directly above the other part, but also the case where there is another part in the middle.

In contrast, when an element is referred to as being "directly on" another element, there are no intervening elements present.

Throughout the specification, when a part "includes" a certain component, it means that other components may be further included rather than excluding other components unless specifically stated to the contrary.

Various exemplary embodiments of the present invention will hereinafter be described in detail with reference to the accompanying drawings.

Figure 2:
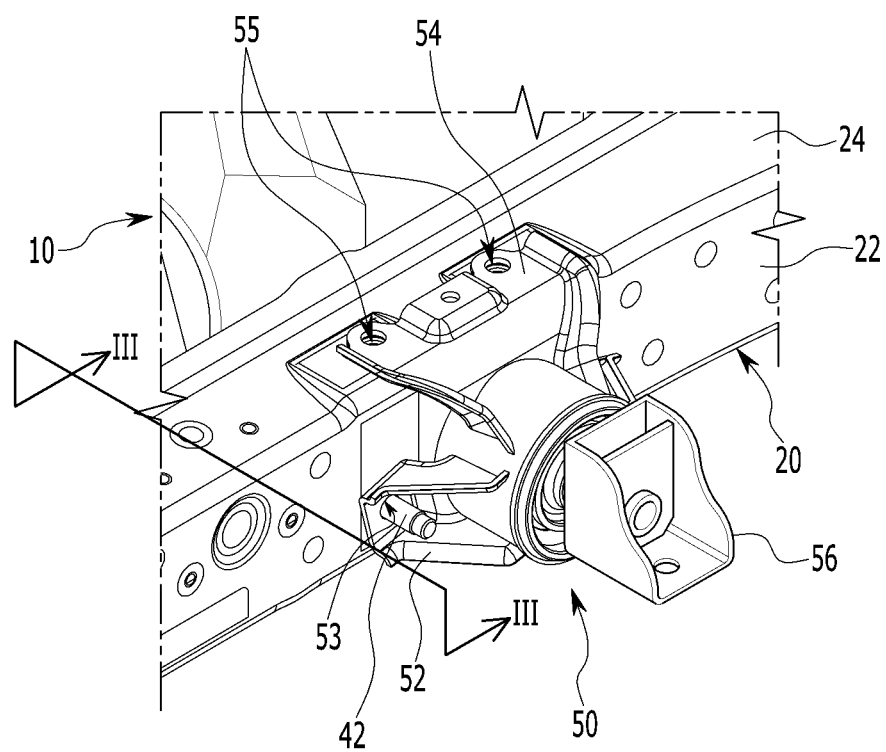
FIG. 2 is a perspective view of a power electric module mounting structure according to various exemplary embodiments of the present invention.
Figure 3:
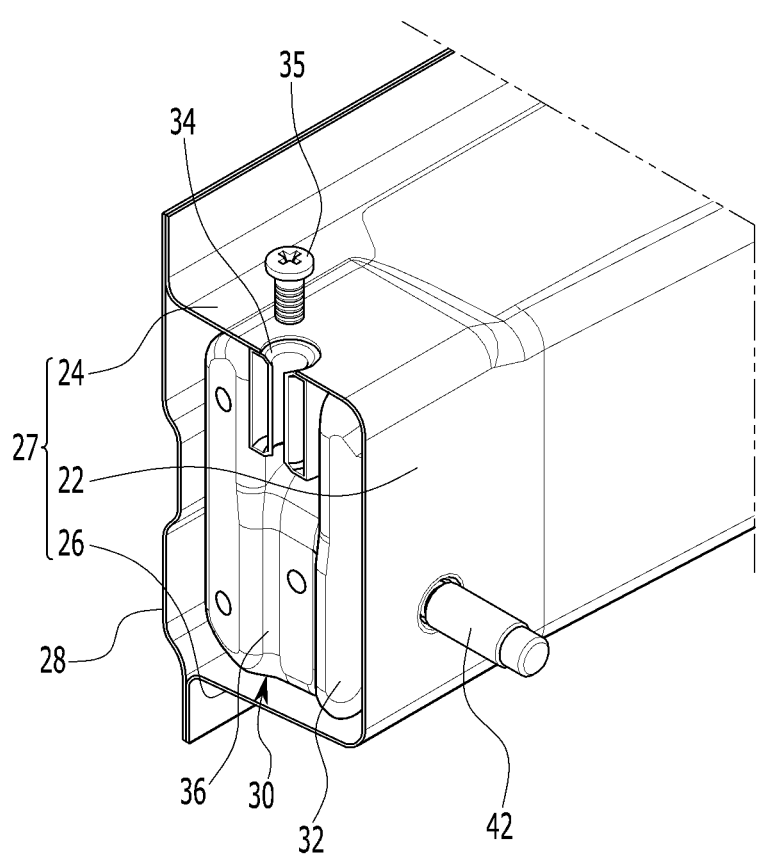
FIG. 3 is a cross-sectional perspective view along the line III-III of FIG. 2.

FIG. 1 is a top plan view of a power electric module mounting structure according to various exemplary embodiments of the present invention, FIG. 2 is a perspective view of a power electric module mounting structure according to various exemplary embodiments of the present invention, and FIG. 3 is a cross-sectional perspective view along the line III-III of FIG. 2.

Referring to FIG. 1 to FIG. 3, a power electric module mounting structure according to various exemplary embodiments of the present invention may include a front side member 20 provided in a longitudinal direction of a vehicle body 10 and including a side surface 22 formed in an internal direction of the vehicle body 10 and an upper surface 24 connected to the side surface 22, a bulk head 30 mounted inside the front side member 20, and a mounting bracket 50 connected to the side surface 22 and the upper surface 24 of the front side member 20 through the bulk head 30 to mount a power electric module 60.

In general power electric module mounting structure, a power electric module is mounted on an upper portion of the front side member or the upper portion of the front side member and the vehicle body, for example, a sub-frame, and the distance between the sub-frames from a center of gravity of the power electric module is relatively long, so that durability and NVH performance may be adversely affected.

However, in the power electric module mounting structure according to the exemplary embodiment of the present invention, the power electric module 60 is mounted on the side surface 22 and the upper surface 24 of the front side member 20 through a module mounting portion 56 and the mounting bracket 50. Accordingly, the connection position between the power electric module 60 and the front side member 20 may be relatively close, and the difference in height between the center of gravity of the power electric module 60 and the front side member 20 may also be reduced.

The vehicle according to the exemplary embodiment of the present invention includes the power electric module 60 and may be an EV vehicle to which the power electric module mounting structure according to the exemplary embodiment of the present invention is applied.

The front side member 20 includes a front side internal panel 27 including the side surface 22, the upper surface 24 and a lower surface 26, and a front side external panel 28, and the front side internal panel 27 and the front side external panel 28 may form a closed cross-section, and the bulk head 30 may be mounted in the closed cross-section.

Figure 4:
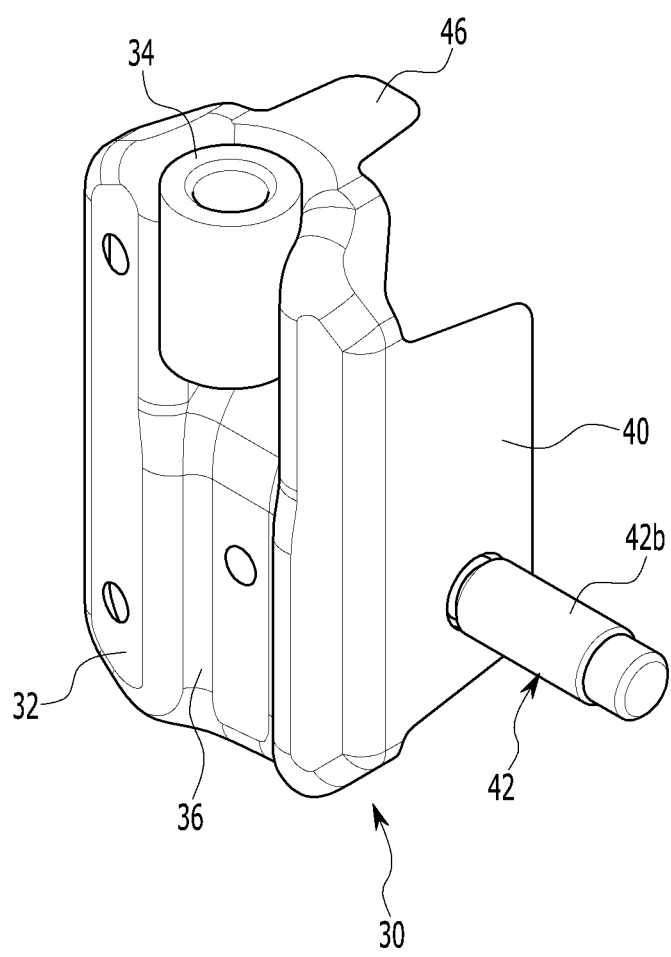
FIG. 4 and FIG. 5 is a perspective view of a bulk head which may be applied to a power electric module mounting structure according to various exemplary embodiments of the present invention.
Figure 5:
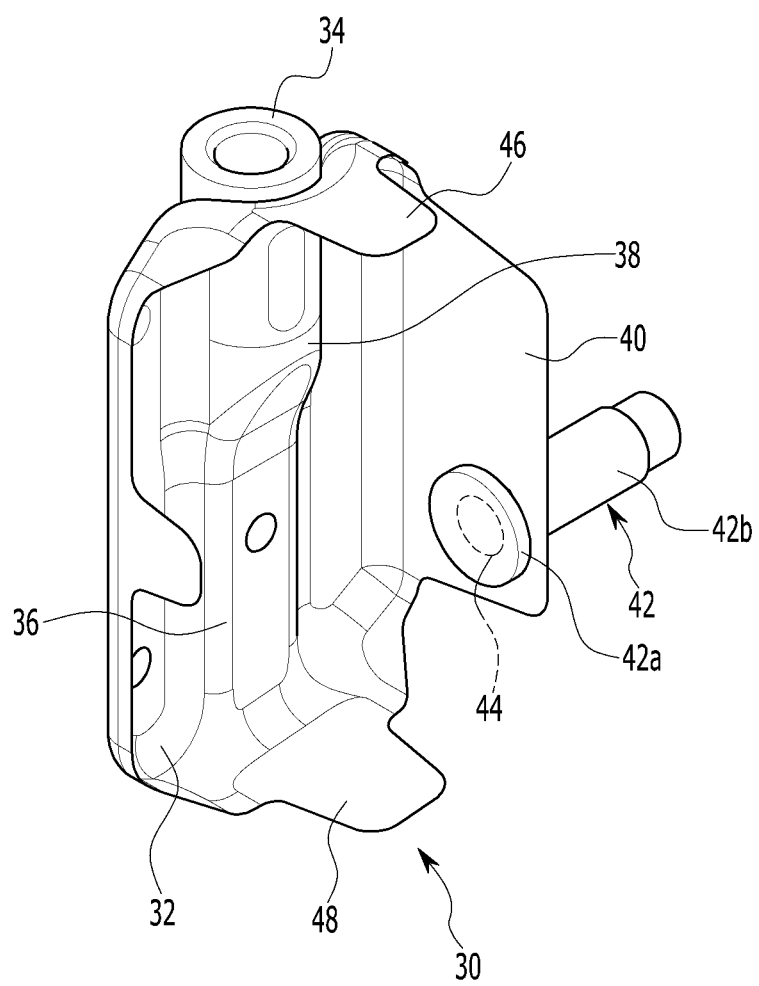

FIG. 4 and FIG. 5 is a perspective view of a bulk head which may be applied to a power electric module mounting structure according to various exemplary embodiments of the present invention.

Referring to FIG. 2 to FIG. 5, the bulk head 30 may include a first connection portion 32 for coupling with the mounting bracket 50, and a second connection portion 40 bent from the first connection portion 32.

The bulk head 30 may further include a connection pipe 34 connected to the first connection portion 32, and a connection rod 42 mounted on the second connection portion 40.

The drawing shows that the connection pipe 34 is provided in the upper surface 24 direction and the connection rod 42 is provided in the side surface 22 direction thereof, but is not limited thereto, and the opposite configuration is also possible.

The first connection portion 32 may include a first recess portion 36 formed stepped inwardly. The first recess portion 36 is formed in the up and down directions of the front side member 20 to increase the up and down direction strength of the front side member 20.

The first connection portion 32 may further include a second recess portion 38 formed more concave inward than the first recess portion 36 to mount the connection pipe 34. The second recess portion 38 may mount the connection pipe 34 without any additional configuration. Furthermore, the second recess portion 38 is concave more inward than the first recess portion 36, and a connection portion between the second recess portion 38 and the first recess portion 36 may support the lower portion of the connection pipe 34.

In the connection pipe 34, for example, a connection bolt 35 is inserted to mount the mounting bracket 50.

In the second connection portion 40, a connection hole 44 to which the connection rod 42 is coupled may be formed. The connection rod 42 may include a rod head 42a, a rod body 42b connected to the rod head 42a and protruded through the connection hole 44, and the rod head 42a has a relatively larger diameter than the connection hole 44 diameter. Thus, the connection rod 42 may be rigidly mounted to the second connection portion 40 with a simple configuration.

The bulk head 30 may further include extensions 46 and 48 bent from the first connection portion 32. The extensions 46 and 48 may support the inside of the upper surface 24 and the lower surface 26 of the front side member 20, respectively, so that the bulk head 30 and the front side member 20 may be more rigidly coupled.

Referring to FIG. 1 to FIG. 3, the bulk head 30 is provided in plural, and the mounting bracket 50 may be combined with at least two bulk heads 30. Only one the bulk head 30 is shown in the drawing, but the bulk head 30 may be provided in any suitable number to mount the mounting bracket 50 inside the front side member 20.

The mounting bracket 50 may include a bracket side connection portion 52 connected to the side surface 22 and a bracket upper connection portion 54 connected to the upper surface 24. Mounting holes 53 and 55 are formed in the bracket side connection portion 52 and the bracket upper connection portion 54, respectively, so that the connection bolt 35 and the connection rod 42 may be inserted into the mounting holes 53 and 55, respectively. Furthermore, the mounting bracket 50 may be connected to the side surface 22 and the upper surface 24 of the front side member 20 through the connection bolt 35 and the connection rod 42.

Figure 6:
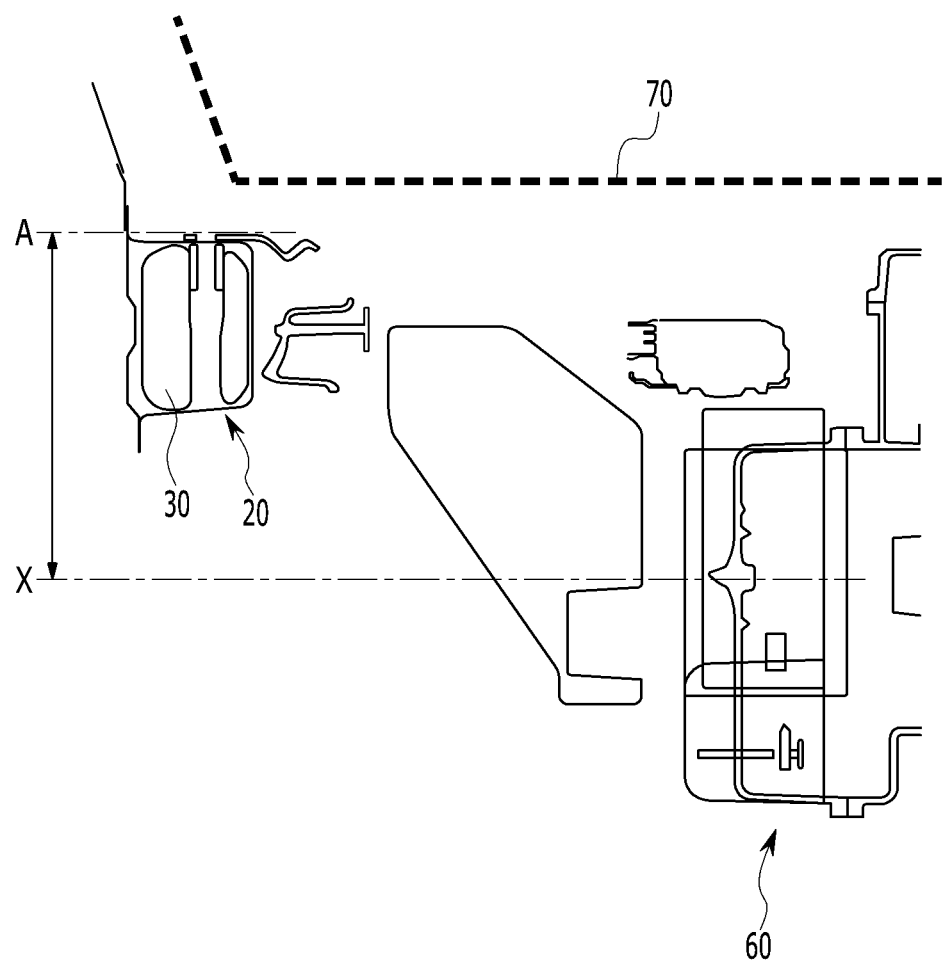
FIG. 6 is a cross-sectional view of a vehicle body including a power electric module mounting structure according to various exemplary embodiments of the present invention.
Figure 7:
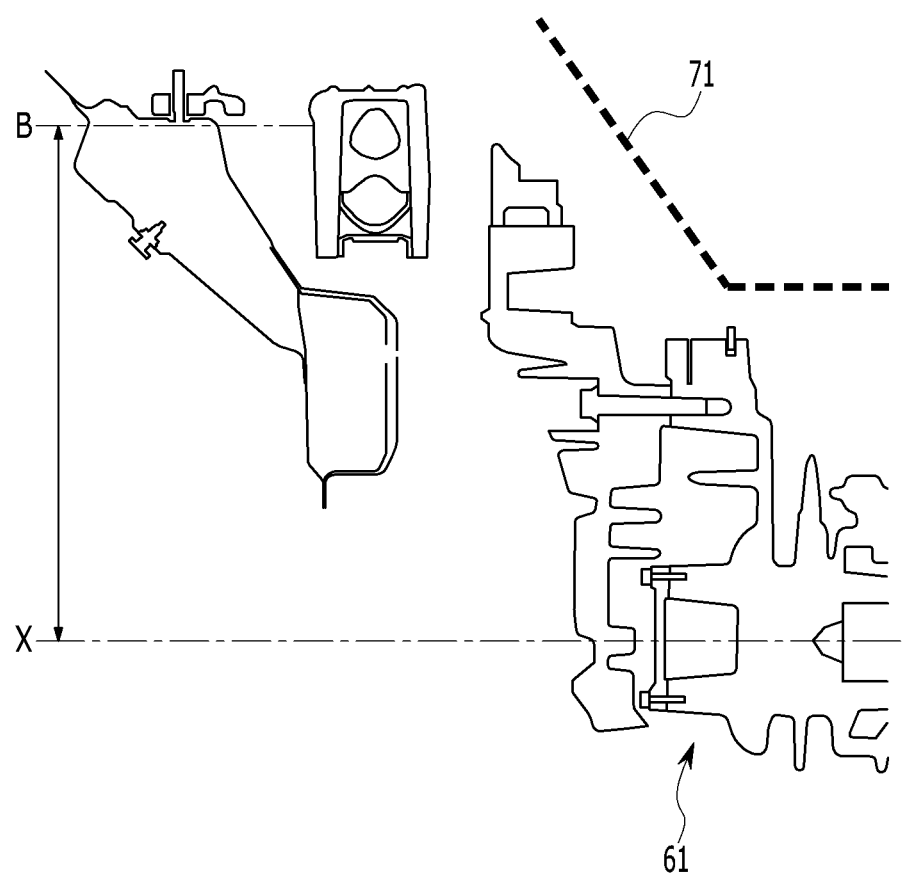
FIG. 7 is a cross-sectional view of a vehicle body including a typical power electric module mounting structure.

FIG. 6 is a cross-sectional view of a vehicle body including a power electric module mounting structure according to various exemplary embodiments of the present invention, and FIG. 7 is a cross-sectional view of a vehicle body including a typical power electric module mounting structure.

A trunk compartment 70 may be formed on the upper portion of the power electric module 60.

In FIG. 6 and FIG. 7, the X-line is an imaginary line passing through the mass centers of the power electric modules 60, and 61, and A is a connection portion between the power electric module mount module 60 and the side member 20 according to various exemplary embodiments of the present invention, for example it is an imaginary line indicating the mount position of the connection bolt 35. B represents a connection portion between a general power electric module mount module 61 and a side member, or a sub-frame.

Referring to FIG. 6 and FIG. 7, it may be seen that the trunk compartment 70 is relatively large due to the power electric module mounting structure according to various exemplary embodiments of the present invention, compared to the lower surface and trunk compartment 71 according to the general mount configuration.

Comparing to the general mounting structure, in the power electric module mounting structure according to various exemplary embodiments of the present invention, the relative distance between the imaginary line passing through the mass center of the power electric module 60 and the connection portion (A) of the power electric module mount module 60 and the side member 20 is reduced by approximately 40% and thus it may improve durability performance and NVH performance.

Furthermore, in the exemplary embodiment of the power electric module mounting structure, the upper space of the power electric module mount module 60 may be secured, so that space utilization, for example, trunk compartment may be expanded.

Furthermore, in the power electric module mounting structure according to various exemplary embodiments of the present invention, the power electric module 60 is mounted on the side surface 22 and the upper surface 24 of the front side member 20 to prevent the power electric module 60 from rolling so that it may provide a robust structure.

Furthermore, in the power electric module mounting structure according to various exemplary embodiments of the present invention, a closed cross-section is formed inside the front side member 20, and the bulk head 30 is provided in the closed cross-section. Thus, in a case of a vehicle collision, the power electric module 60 may be prevented from being separated.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A power electric module mounting structure comprising:
a front side member provided in a longitudinal direction of a vehicle body and including:
a side surface formed in an internal direction of the vehicle body; and
an upper surface connected to the side surface;
a bulk head mounted inside the front side member; and
a mounting bracket connected to the side surface and the upper surface of the front side member through the bulk head to mount a power electric module on the mounting bracket,
wherein the bulk head includes:
a first connection portion for coupling with the mounting bracket; and
a second connection portion bent from the first connection portion, and
wherein the bulk head further includes:
a connection pipe connected to the first connection portion; and
a connection rod mounted on the second connection portion.

2. The power electric module mounting structure of claim 1, wherein the mounting bracket includes:
a bracket side connection portion connected to the side surface via the connection rod; and
a bracket upper connection portion connected to the upper surface via the connection pipe.

3. The power electric module mounting structure of claim 2, wherein the front side member further includes:
a front side internal panel having the side surface, the upper surface and a lower surface; and
a front side external panel,
wherein the front side internal panel and the front side external panel form a closed cross-section into which the bulk head is mounted, and
wherein the connection rod of the bulk head is mounted to penetrate the side surface of the front side internal panel.

4. The power electric module mounting structure of claim 1, wherein the first connection portion includes a first recess portion formed stepped inwardly.

5. The power electric module mounting structure of claim 4, wherein the first connection portion further includes a second recess portion formed more concave inward than the first recess portion to mount the connection pipe.

6. The power electric module mounting structure of claim 1, wherein in the second connection portion, a connection hole to which the connection rod is connected is formed.

7. The power electric module mounting structure of claim 1, wherein the bulk head further includes an extension curved from the first connection portion.

8. The power electric module mounting structure of claim 7, wherein the extension is provided in plural to include a first extension supporting the inside of the upper surface of the front side member and a second extension supporting the inside of a lower surface of the front side member.

9. The power electric module mounting structure of claim 1, wherein the bulk head is provided in plural to include at least two bulk heads, wherein the mounting bracket is connected to the at least two bulk heads.

10. The power electric module mounting structure of claim 1, wherein a trunk compartment is formed on an upper portion of the power electric module.

11. The power electric module mounting structure of claim 1, wherein the front side member includes:
a front side internal panel having the side surface, the upper surface and a lower surface; and
a front side external panel,
wherein the front side internal panel and the front side external panel form a closed cross-section into which the bulk head is mounted.

12. A power electric module mounting structure comprising:
a front side member provided in a longitudinal direction of a vehicle body and including:
a side surface formed in an internal direction of the vehicle body; and
an upper surface connected to the side surface;
a bulk head mounted inside the front side member; and
a mounting bracket connected to the side surface and the upper surface of the front side member through the bulk head to mount a power electric module on the mounting bracket,
wherein the bulk head is provided in plural to include at least two bulk heads,
wherein the mounting bracket is connected to the at least two bulk heads, and
wherein the mounting bracket includes:
a bracket side connection portion connected to the side surface; and
a bracket upper connection portion connected to the upper surface.

13. An electric vehicle including an power electric module mounting structure,
wherein the power electric module mounting structure comprises:
a front side member provided in a longitudinal direction of a vehicle body and including:
a side surface formed in an internal direction of the vehicle body; and
an upper surface connected to the side surface;
a bulk head mounted inside the front side member; and
a mounting bracket connected to the side surface and the upper surface of the front side member through the bulk head to mount a power electric module on the mounting bracket,
wherein the bulk head is provided in plural to include at least two bulk heads,
wherein the mounting bracket is connected to the at least two bulk heads, and
wherein the mounting bracket includes:
a bracket side connection portion connected to the side surface; and
a bracket upper connection portion connected to the upper surface.

* * * * *